(12) United States Patent
Moscardini (10) Patent No.: US 11,530,686 B2
(45) Date of Patent: Dec. 20, 2022

(54) WIND GENERATOR

(71) Applicant: Andrea Moscardini, Pelago—Firenze (IT)

(72) Inventor: Andrea Moscardini, Pelago—Firenze (IT)

(73) Assignee: Andrea Moscardini, Florence (IT)

( * ) Notice: Subject to any disclaimer, the term of this patent is extended or adjusted under 35 U.S.C. 154(b) by 273 days.

(21) Appl. No.: 16/905,314

(22) Filed: Jun. 18, 2020

(65) Prior Publication Data

US 2020/0400125 A1 Dec. 24, 2020

(30) Foreign Application Priority Data

Jun. 19, 2019 (IT) .................. 102019000009435

(51) Int. Cl.
| | |
|---|---|
| *F03D 9/32* | (2016.01) |
| *F03D 9/25* | (2016.01) |
| *B63B 15/00* | (2006.01) |
| *B63H 9/08* | (2006.01) |
| *F03D 1/02* | (2006.01) |

(52) U.S. Cl.
CPC ............ *F03D 9/32* (2016.05); *B63B 15/0083* (2013.01); *B63H 9/08* (2013.01); *F03D 1/02* (2013.01); *F03D 9/25* (2016.05); *B63B 2209/20* (2013.01); *F05B 2240/913* (2013.01); *Y02T 70/00* (2013.01)

(58) Field of Classification Search
CPC ..... F03D 9/32; F03D 9/25; F03D 1/02; B63B 15/0083; B63B 2209/20; B63H 9/08; F05B 2240/913; Y02T 70/00
See application file for complete search history.

(56) References Cited

U.S. PATENT DOCUMENTS

| | | | | |
|---|---|---|---|---|
| 2002/0071757 | A1* | 6/2002 | Navarro | .................... F03D 7/06 |
| | | | | 415/4.2 |
| 2007/0243063 | A1* | 10/2007 | Schellstede | ............. E02D 27/42 |
| | | | | 416/10 |
| 2014/0363287 | A1* | 12/2014 | Talarico | .................... F03D 5/06 |
| | | | | 416/223 R |

FOREIGN PATENT DOCUMENTS

DE 3939862 A * 6/1991 ............. F03D 13/20

* cited by examiner

*Primary Examiner* — Stephen P Avila
(74) *Attorney, Agent, or Firm* — McGlew and Tuttle, P.C.

(57) ABSTRACT

A wind generator for sailboats including a mast (A) provided with crosstrees (C), including: at least one wind generator (1) provided with a distribution of blades (2) arranged to rotate integrally with a shaft (6) of axis (a) in response to receiving a wind flow in an active direction (v) incident to the blades distribution; an electric generator (3) operatively connected to the generator (1) for converting the rotation of the blades (2) into electricity, comprising structure (22, 41) for fixing the generator (1) to a crosstree (C), and with the blades (2) being movable from an open operating position (P1) of maximum incidence of wind flow (F) to a closed non-operating position (P2) of minimum obstruction.

9 Claims, 8 Drawing Sheets

FIG.6c

WIND GENERATOR

CROSS REFERENCE TO RELATED APPLICATIONS

This application claims the benefit of priority under 35 U.S.C. § 119 of Italian Patent Application 102019000009435, filed Jun. 19, 2019, the entire contents of which are incorporated herein by reference.

FIELD OF THE INVENTION

The invention relates to a wind generator.

More in particular, the invention relates to a wind generator of the type used on vessels such as sailboats.

BACKGROUND OF THE INVENTION

At present, wind generators are known which are installed on board boats, generally recreational sailboats, in order to produce electricity to be stored in batteries and thus prolong the autonomy of the electrical equipment on board.

Although they can be useful for significantly improving the energy autonomy of the boat, the known systems present serious drawbacks because they must necessarily be installed in a lower part of the boat, typically close to the cockpit, in order to avoid hindering the maneuvers of the sails.

This placement creates significant inconvenience for the crew because the generator produces a disturbing noise, especially at night.

In addition, the relatively low position of the generator results in the placement of the turbine blades in a region with less wind and greater turbulence, resulting in less efficiency of the system.

The dimensions and speed of rotation are both factors that hinder the use of the generator on board a boat, in particular a sailboat, in which the available external spaces are relatively limited, and the absence of noise is instead highly appreciated and sought after by users.

SUMMARY OF THE INVENTION

The present invention intends to overcome the drawbacks of the known solutions and to propose a wind generator for boats, in particular recreational sailboats, which allows to generate electricity without reducing the living spaces of the boat and reducing the disturbance of the noise emitted by the generator during use and increasing the energy efficiency of the generator itself.

These objects have been achieved by developing a wind generator according to the present invention.

A first advantage is that the generator is positioned higher, and can therefore exploit wind zones that are more intense and less turbulent with respect to the generators installed near the hull.

A second advantage of the invention is that the distance of the generator from the areas occupied by the users, for example from the cabins and from the cockpit of the boat, allows to reduce the disturbance due to the noise emitted by the generator, in particular at night.

A further advantage is the possibility of using longer blades and consequently lower rotation speeds with further noise reduction.

A further advantage of the invention is that the generator is used alternatively to the sails without hindering their maneuvers, because it can easily be folded into a minimum obstruction position when it is not in use.

A further advantage of the invention is that the generator of the invention exploits the ability of a boat moored with an anchor to spontaneously orient itself with respect to the wind, so that the generator, orienting with the boat, always receives the wind from the correct direction.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

With reference to the attached drawings, a preferred embodiment of a wind generator according to the invention is described.

In the described example, the generator is applied to a sailboat provided with a mast A provided with crosstrees C.

Reference will be made herein to crosstrees C of the type used in conjunction with mast support stays S, but it is understood that the generator of the invention may be applied to any type of crosstree, to be understood as a structure protruding from the mast.

In an example implementation, the same generator body can be fixed to the boat's mast A and form a protruding structure itself.

Referring to the embodiment illustrated in FIGS. 1 to 7, the generator comprises at least one wind generator 1 fixed to the crosstree C and provided with a distribution of blades 2 arranged to rotate integrally with a shaft 6 of axis (a) in response to receiving a wind flow in an active direction (v) incident on the blades and an electric generator 3 operatively connected to the generator 1 to convert the rotation of the blades 2 into electricity.

The general operation of the generator for the conversion of wind energy into electricity is of a conventional type per se and is therefore not described in detail.

It is understood that the generator 2 will be equipped with electrical connections to transmit the collected energy, for example to batteries of the boat.

According to the invention the blades 2 are movable from an open operating position P1 of maximum wind flow incidence to a closed non-operating position P2 of minimum obstruction.

Advantageously, the operating position of the blades 2 will be activated in mooring conditions of the boat, typically mooring with the anchor, and is therefore an alternative to the maneuvering configuration of the equipment of the boat.

Likewise, when the boat is sailing, the blades will be in the position of minimum obstruction, thus causing no or minimum disturbance to the manoeuvres and wind flow destined for the sails.

In different preferred embodiments, the generator may be fixed to a specially designed crosstree or applied to a pre-existing crosstree.

Figures 7A, 7B, 7C:
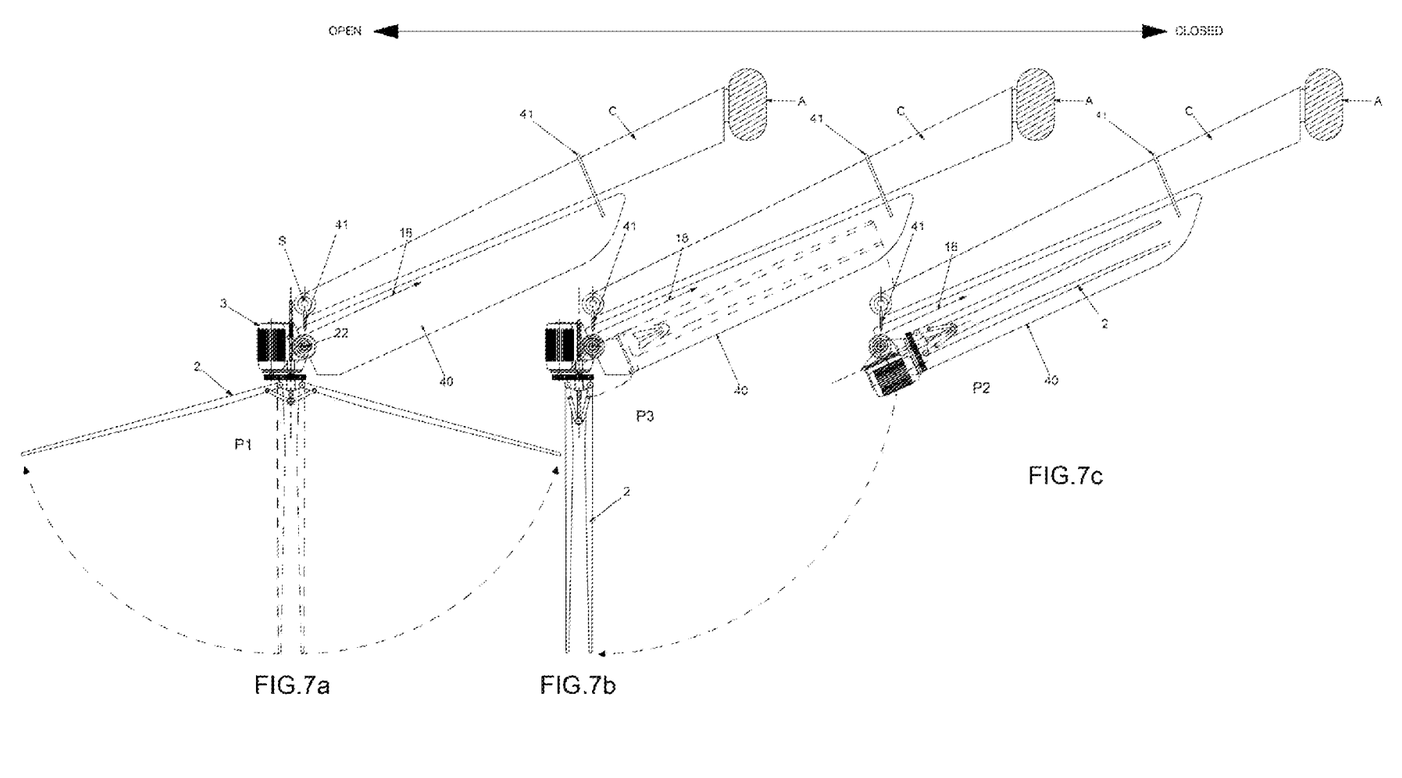
FIG. 7a is a view showing a further preferred embodiment of the generator in the open operating configuration.
FIG. 7b is a view showing a further preferred embodiment of the generator in the axially closed configuration.
FIG. 7c is a view showing a further preferred embodiment of the generator in the fully closed configuration inside a containment nacelle applicable to the crosstree of the boat.

In addition, in the position of minimum obstruction P2 the blades 2 can be gathered close to the crosstree, or enclosed in a compartment 8 integral with the crosstree C, for example realized in a single profile having both a structural function as a crosstree and a housing of the folded blades 2, or still they can be enclosed inside a nacelle which is applied but separable from the crosstree as shown by way of example in FIGS. 7a-7c.

Referring to the embodiments shown in FIGS. 1 to 7, the wind generator is of the type with an axis of rotation (a) parallel to the incident direction (v) of the wind and the shaft 6 is mounted orthogonally to the crosstree C.

In order to allow the movement of the blades 2 from the operating position P1 to the position of minimum obstruction P2, first folding means 5 of the blades are provided to rotate the individual blades 2 from the position P1 of maximum incidence to an intermediate gathered position P3 in which the blades are substantially aligned with the axis (a) of rotation of the shaft 6 and second folding means 7 to move the set of gathered blades 2 from the intermediate position P3 to the closed position P2 of minimum obstruction, in which the blades are substantially lowered on and aligned with the crosstree C.

Preferably, the first folding means 5 comprise an "umbrella" kinematic mechanism in which each blade 2 is articulated in a rotation pin 25 integral with the shaft 6 and a connecting rod 10 is provided for each blade 2, hinged at one end at a point 11 of the blade and at the second end 12 to a stem 13 slidable inside the shaft 6 against the action of an antagonistic spring 21, preferably a compression spring arranged between an abutment 17 integral with the stem 13 and a stop bracket 24 integral with the electric generator 3.

In this example embodiment, the shaft 6 of the wind generator 1 is distinct from the rotor axis of the electric generator and the conversion of wind energy into electricity takes place thanks to the rotational movement of the shaft 6, integral with the rotation of the blades 2, which drags a gear 14 connected in turn to the rotor 15 of the electric generator 3.

The abutment 17 of the stem 13 is further engaged with an arm 19 rotating about a rotation pin 22 integral with the crosstree C and is rotatably operable by a tie rod 18 against the action of an antagonist spring 20, preferably a coil spring wrapped around the pin 22.

Advantageously, the pin 22 also serves for fixing the generator 1 to the structure of the crosstree C, possibly in cooperation with a reinforcing structure 45, for example a box structure applicable to the crosstree.

In operation, when the tie rod 18 is not in tension the coil spring 20 tends to detach the arm 28 from the abutment 17 which is then pushed together with the stem 13 by the compression spring 21 away from the second ends 12 of the connecting rods 10 from the rotation pins 25 of the blades 2 with respect to the shaft 6.

As a result of the thrust of the spring 21, the stem 13 slides along the shaft 6 and the connecting rods 10 close the blades 2 until they are brought to a position substantially parallel to the axis (a).

The "umbrella" kinematic mechanism has been described as a preferred embodiment, but it is understood that the first folding can also be achieved with different mechanisms, for example by providing blades which are radially foldable instead of in the umbrella mode.

In this position, the second folding means 7 intervene to move the set of folded blades 2 from the intermediate position P3 to the closed position P2.

The second means 7 perform the function of lowering the blades 2, already gathered in a bundle, along the crosstree.

In the described example, the second means 7 comprise the arm 19 abutting a further pin 27 integral with a plate 29 hinged on the pin 22 of the arm 19 on which the generator 3 is mounted.

In this configuration, the arm 19 driven by the spring 20 pushes on the abutment pin 27, rotating the plate 29 together with the electric generator 3 and the set of blades 2 aligned with the axis of rotation (a) around the pin 22.

At the end of the rotation around the pin 22, the generator 1 is in the position of minimum obstruction P2 (FIG. 3c) with the blades 2 substantially aligned with the crosstree C, preferably inside a housing 8.

Advantageously, in this embodiment the first and second folding means are actuated by a single actuator element, consisting of the tie rod 18.

Preferably the tie rod 18 may be operated by the crew by means of returns 43 to an easily accessible maneuvering point 44.

Figure 1:
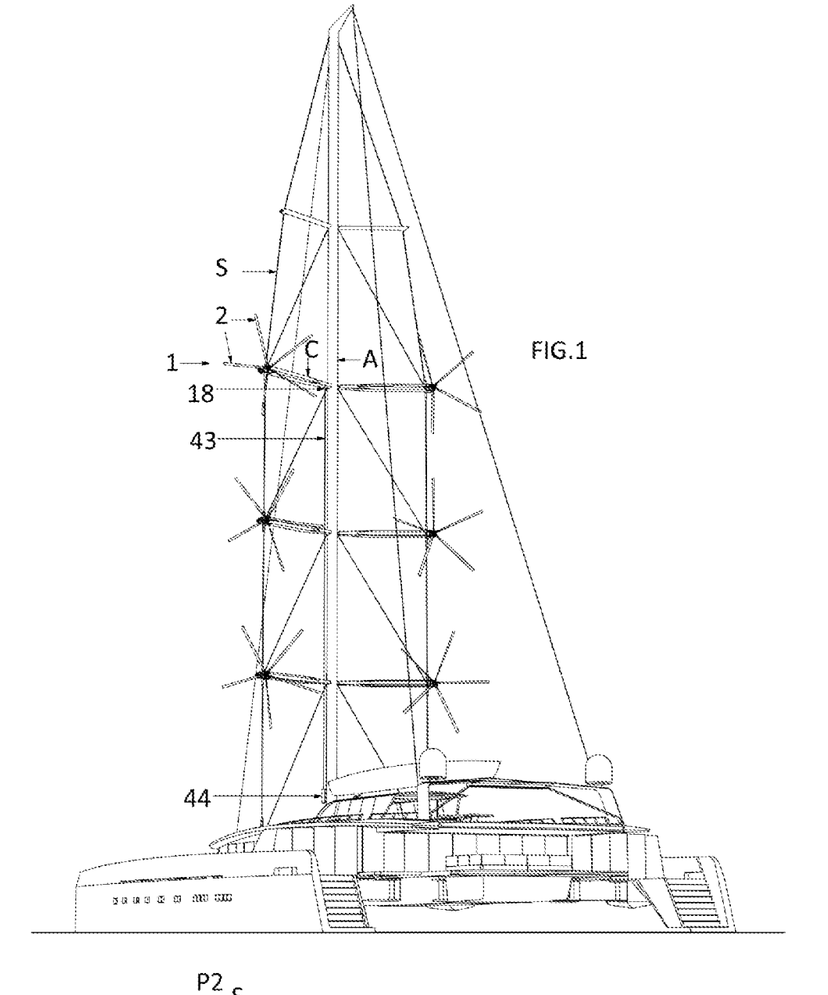
FIG. 1 is a view showing an example of a sailboat provided with the generator of the invention.
Figures 2A, 2B, 2C:
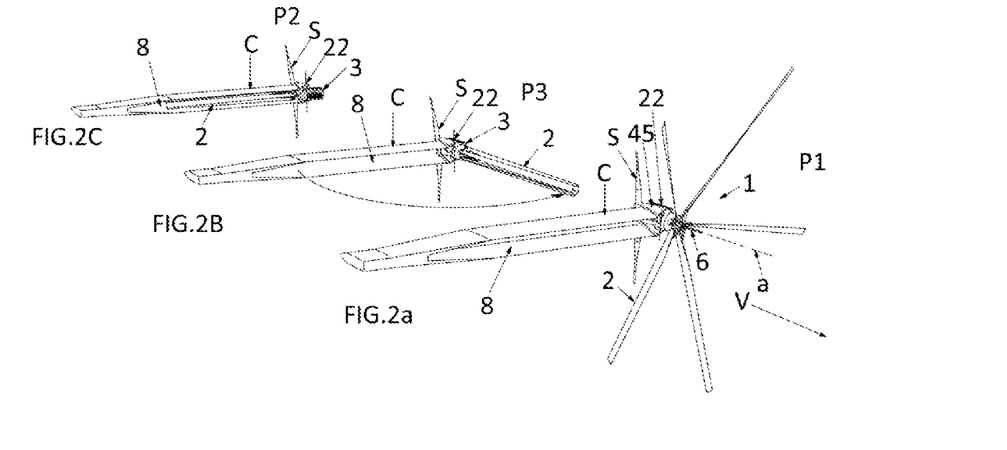
FIG. 2a is a view showing a generator according to the invention with the blades in an open operating configuration.
FIG. 2b is a view showing a generator according to the invention with the blades in an axially closed configuration.
FIG. 2c is a view showing a generator according to the invention with the blades in a fully closed configuration lowered on the crosstree of the boat of FIG. 1.
Figures 3A, 3B, 3C:
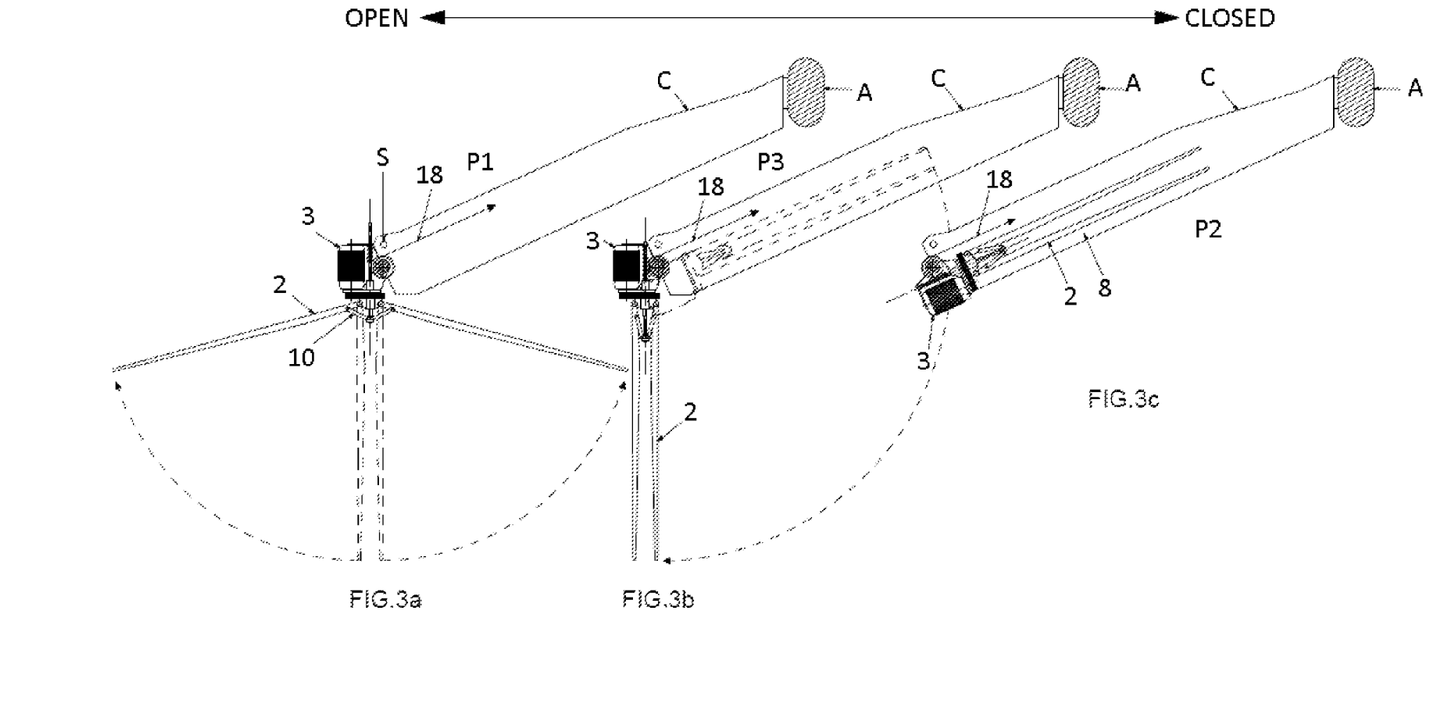
FIG. 3a is a view showing a preferred embodiment of the opening and closing mechanism, for moving the blades in an open operating configuration.
FIG. 3b is a view showing a preferred embodiment of the opening and closing mechanism, for moving the blades in axially closed configuration.
FIG. 3c is a view showing a preferred embodiment of the opening and closing mechanism, for moving the blades in a fully closed configuration.
Figure 4A:
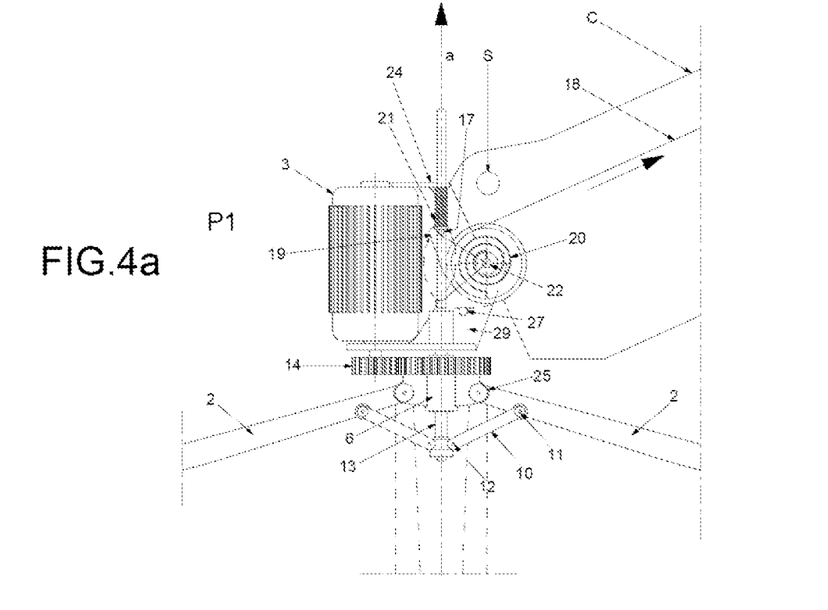
FIG. 4a is a view showing the detail of the opening and closing mechanism of the blades of the generator of FIGS. 3a-3c.
Figure 4B:
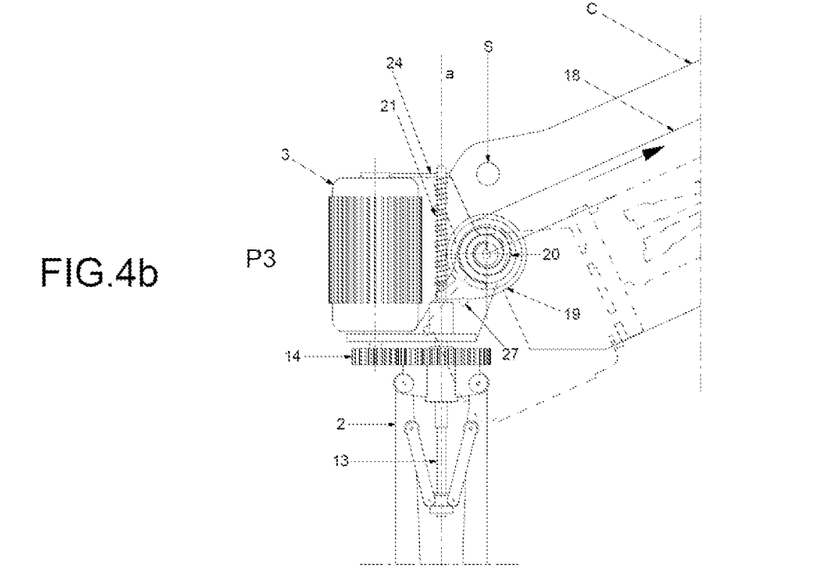
FIG. 4b is a view showing the detail of the opening and closing mechanism of the blades of the generator of FIGS. 3a-3c.
Figure 4C:
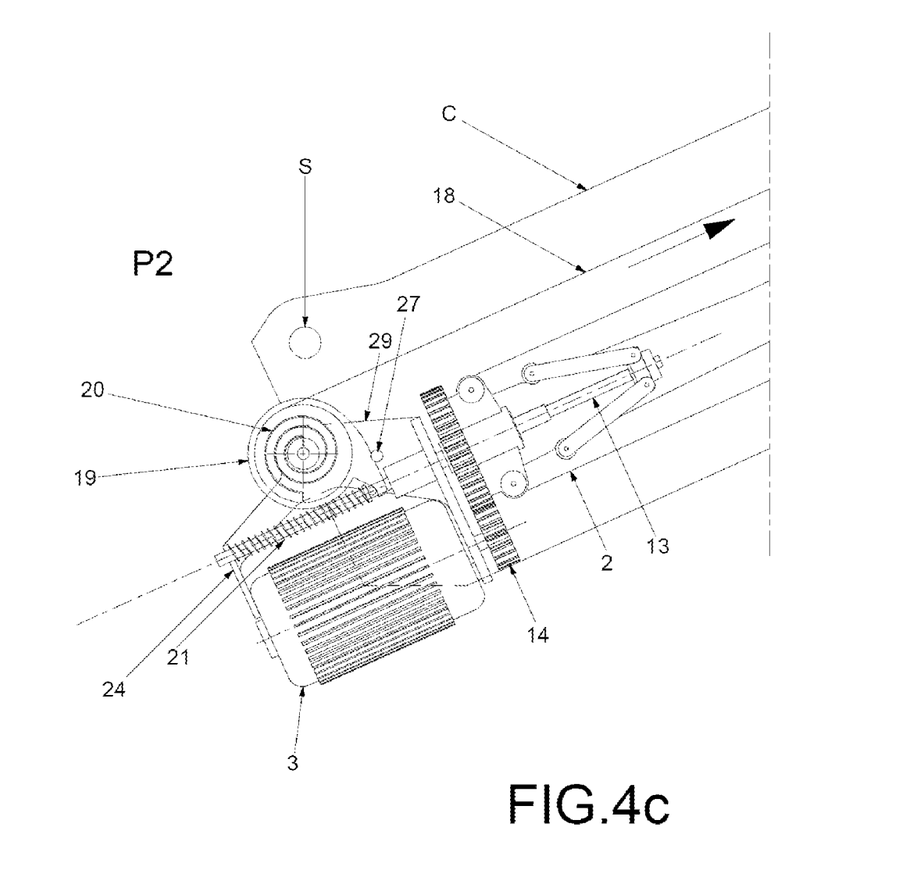
FIG. 4c is a view showing the detail of the opening and closing mechanism of the blades of the generator of FIGS. 3a-3c.
Figure 5A:
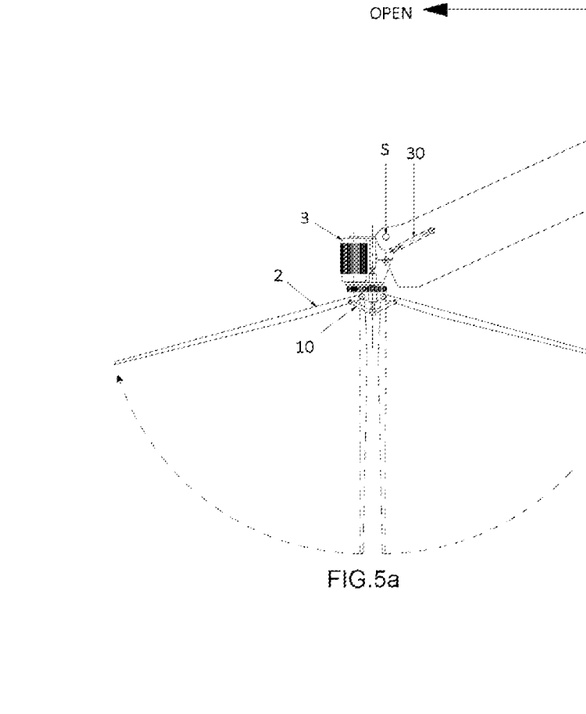
FIG. 5a is a view showing a second preferred embodiment of the opening and closing mechanism, for moving the blades in an open operating configuration.
Figures 5B, 5C:
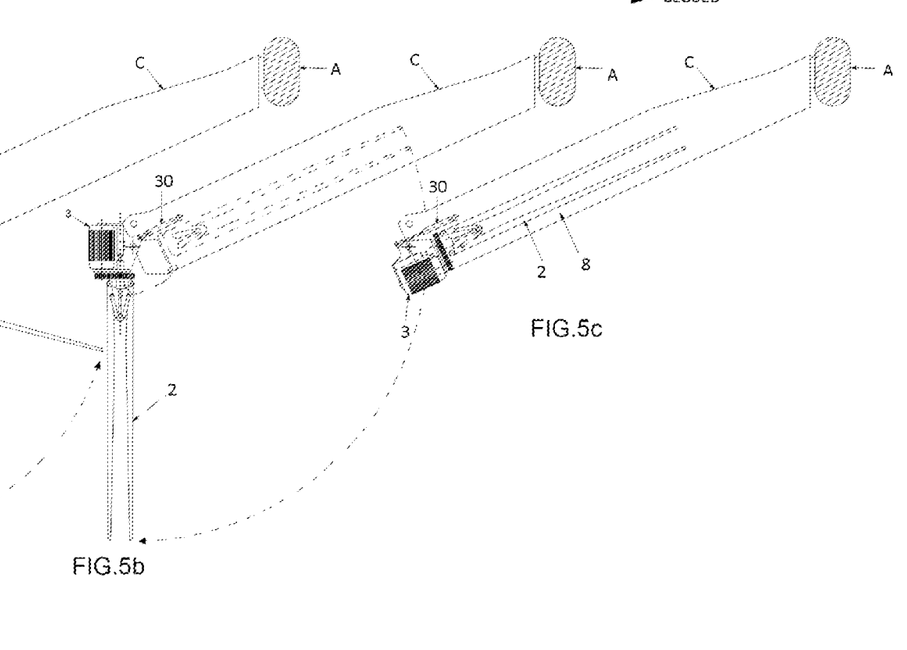
FIG. 5b is a view showing a second preferred embodiment of the opening and closing mechanism, for moving the blades in an axially closed configuration.
FIG. 5c is a view showing a second preferred embodiment of the opening and closing mechanism, for moving the blades in a fully closed configuration.
Figure 6A:
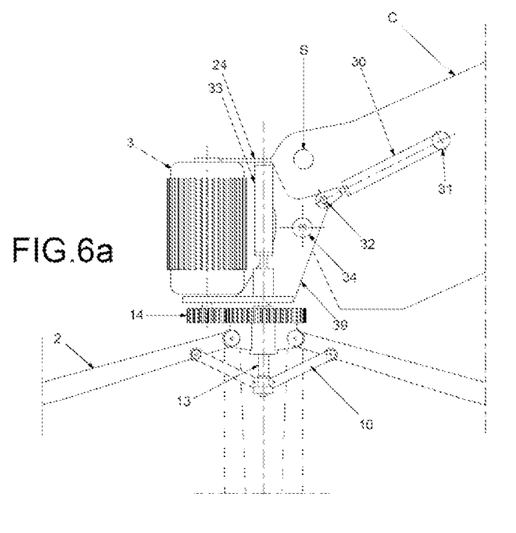
FIG. 6a is a view showing the detail of the opening and closing mechanism of the blades of the generator of FIGS. 5a-5c.
Figure 6B:
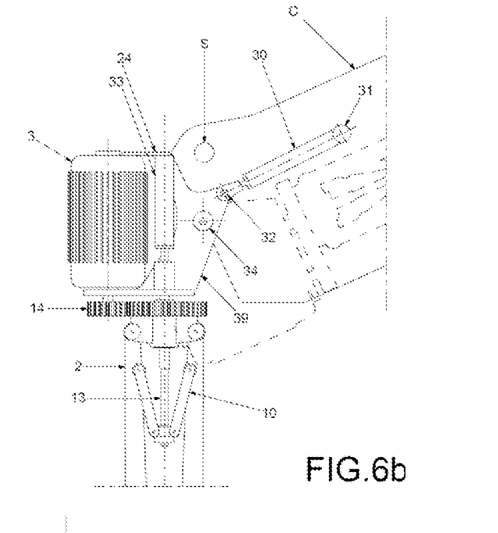
FIG. 6b is a view showing the detail of the opening and closing mechanism of the blades of the generator of FIGS. 5a-5c.
Figure 6C:
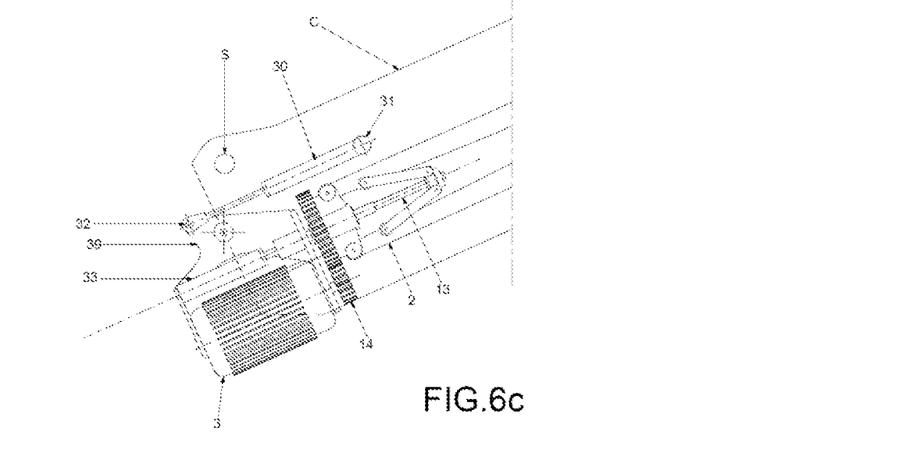
FIG. 6c is a view showing the detail of the opening and closing mechanism of the blades of the generator of FIGS. 5a-5c.

FIGS. 5, 6 show a possible embodiment of the handling means 5 for actuating the umbrella opening and closing maneuver of the blades 2.

In this case, instead of the tie rod 18 and the antagonist spring 21, the movement of the stem 13, already described above, is obtained by means of a linear actuator 33, for example a remotely actuatable electro-pneumatic actuator.

FIGS. 5, 6 also show a possible alternative of the second folding means 7 for the lowering maneuver of the gathered blades 2 on the crosstree C.

In this case, instead of the tie rod 18 associated with the abutment 19 and the antagonist spring 20, a second linear actuator 30 is provided, for example a remotely operable electro-pneumatic actuator, fixed at one end 31 to the crosstree and with the movable end 32 fixed to a plate 39 integral with the generator 3 and hinged at a fulcrum point 34 on the crosstree C.

In this embodiment, in order to obtain the lowering of the blades 2 from the intermediate position P3 to the position of minimum obstruction P2, the actuator 30 pushes on the plate 39, rotating it together with the generator 3 and the blades 2 around the fulcrum 34 until the lowering of the blades 2 on the crosstree C inside the compartment 8.

With reference to FIG. 7, an embodiment of the generator is shown in which the generator is not fixed directly to the crosstree, but to a nacelle 40 fixed with fixing means 41, for example brackets, to the crosstree C.

The operation is similar to that which has already been described, providing also in this case a first umbrella-like movement of closing the blades 2 around the axis of the shaft 6 and a second movement of lowering the gathered blades that rotate about the rotation pin 22 until they align with the crosstree.

Unlike that which was previously described, in the position P2 of minimum obstruction the blades are substantially parallel to the crosstree C but arranged inside the nacelle 40 rather than inside the compartment 8 of the crosstree. Advantageously, in this embodiment the generator can be applied to already existing crosstree structures.

The invention has been described with reference to a wind generator in which the rotation axis "a" is parallel to the incident direction "v" of the wind, but the generator may also be of the type with a rotation axis orthogonal to the incident direction of the wind and with the blades arranged along the crosstree.

Figure 8:
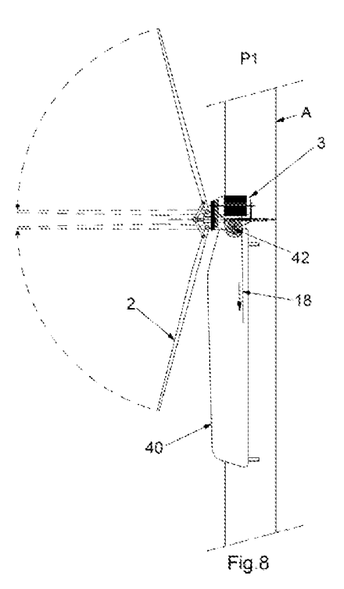
FIG. 8 is a front view of a further preferred embodiment of the generator in the open configuration.
Figure 8A:
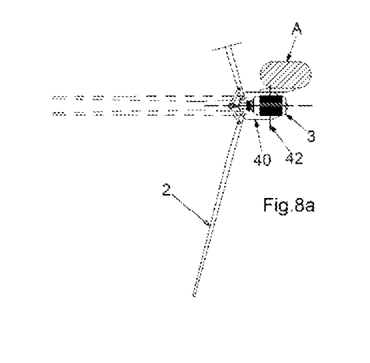
FIG. 8a is a top view of a further preferred embodiment of the generator in the open operating configuration.
Figure 9:
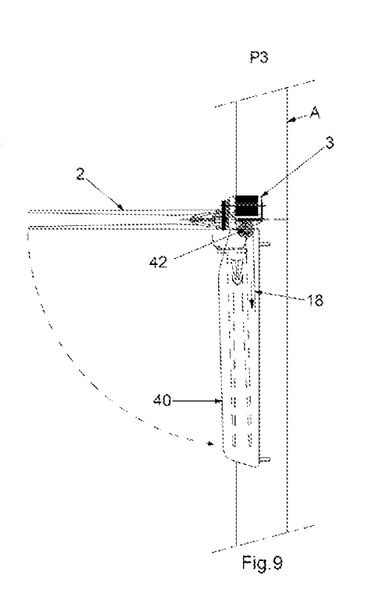
FIG. 9 is a front view of a further preferred embodiment of the generator in the axially closed configuration.
Figure 9A:
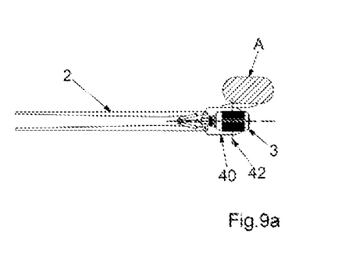
FIG. 9a is a top view of a further preferred embodiment of the generator in the axially closed configuration.
Figure 10:
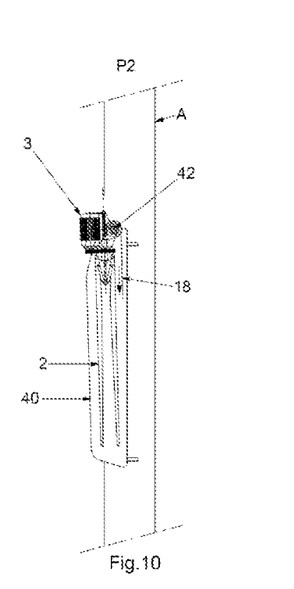
FIG. 10 is a front view of a further preferred embodiment of the generator in the fully closed configuration inside a containment nacelle applicable to the mast of the boat.
Figure 10A:
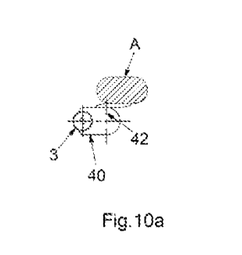
FIG. 10a is a top view of a further preferred embodiment of the generator in the fully closed configuration inside a containment nacelle applicable to the mast of the boat.

With reference to FIGS. 8-8a; 9-9a; 10-10a a preferred embodiment of the generator is described, in which the generator 3 itself constitutes a structure protruding from the mast A of the boat and rotates around it around a pin 42.

In this embodiment, in the operating position P1 the generator is fixed and protruding orthogonally to the must A, with the blades 2 arranged in the position of maximum incidence of the wind flow F and with the axis of the rotation shaft of the blades 2 parallel to the longitudinal axis of the boat, oriented with the wind.

In the P2 non-operative position the generator blades 2 are instead folded first with an umbrella closing movement (position P3) then arranged vertically and parallel to the must, preferably alongside the must itself inside a nacelle 40.

The invention has been described with reference to a preferred embodiment, but it is intended that equivalent modifications can be made without however departing from the scope of the present industrial property right.

While specific embodiments of the invention have been shown and described in detail to illustrate the application of the principles of the invention, it will be understood that the invention may be embodied otherwise without departing from such principles.

What is claimed is:

1. A wind generator for sailboats comprising a mast provided with at least one crosstree, the wind generator comprising:
   at least one wind generator structure provided with a distribution of blades arranged to rotate integrally with a rotation shaft of axis in response to receiving a wind flow in an active direction incident to the blade distribution;
   an electrical generator operatively connected to the at least one generator structure for converting a rotation of the blades into electricity;
   a means for fixing the generator to the mast of the boat;
   a folding means for moving the blades from an open operating position of maximum incidence of wind flow in which the axis of the rotation shaft is parallel to a longitudinal axis of the boat, to a closed non-operating position of minimum obstruction in which the blades are substantially orthogonal to the longitudinal axis of the boat laterally to the boat mast, the folding means comprising;
      a first folding means for moving the blades from the position of maximum incidence in which the rotation shaft is parallel to the longitudinal axis of the boat, to an intermediate gathered position, in alignment of the blades with the direction of the rotation shaft; and
      a second folding means for moving the blades from the intermediate position to the closed position of minimum obstruction in which the blades are substantially orthogonal to the longitudinal axis of the boat laterally to the boat mast.

2. The generator according to claim 1, wherein the first folding means comprises an umbrella closing mechanism of the blades from the open operating position to an intermediate gathered position around the axis of the shaft.

3. The generator according to claim 2, wherein the second folding means comprises a blade lowering closing mechanism from the intermediate gathered position to a position of minimum obstruction substantially orthogonal to the longitudinal axis of the boat laterally to the boat mast.

4. The generator according to claim 1, wherein the first folding means and the second folding means are actuated by a single actuator element.

5. The generator according to claim 4, wherein the single actuator element is a tie rod operable by a crew or by automated servomotors by returns to an easily accessible maneuvering point.

6. The generator according to claim 1, wherein the first folding means and the second folding means are actuated by respective actuators.

7. The generator according to claim 1, wherein in the closed non-operating position of minimum obstruction the blades are enclosed in a compartment of the crosstree.

8. The generator according to claim 1, wherein in the closed non-operating position of minimum obstruction the blades are enclosed in a nacelle applicable to the crosstree through fixing means.

9. A crosstree structure for a mast of sailboats, provided with a generator comprising
   at least one wind generator structure provided with a distribution of blades arranged to rotate integrally with a rotation shaft of axis in response to receiving a wind flow in an active direction incident to the blade distribution;
   an electrical generator operatively connected to the at least one generator structure for converting a rotation of the blades into electricity;
   a means for fixing the generator to the mast of the boat; and
   a folding means for moving the blades from an open operating position of maximum incidence of wind flow in which the axis of the rotation shaft is parallel to a longitudinal axis of the boat, to a closed non-operating position of minimum obstruction in which the blades are substantially orthogonal to the longitudinal axis of the boat laterally to the boat mast, the folding means comprising:
   a first folding means for moving the blades from the position of maximum incidence in which the rotation shaft is parallel to the longitudinal axis of the boat, to an intermediate gathered position, in alignment of the blades with the direction of the rotation shaft,
   a second folding means for moving the blades from the intermediate position to the closed position of minimum obstruction in which the blades are substantially orthogonal to the longitudinal axis of the boat laterally to the boat mast.

* * * * *